T. ANGELL.
Division Steam-Boilers.
No. 151,190. Patented May 26, 1874.
2 Sheets--Sheet 1.
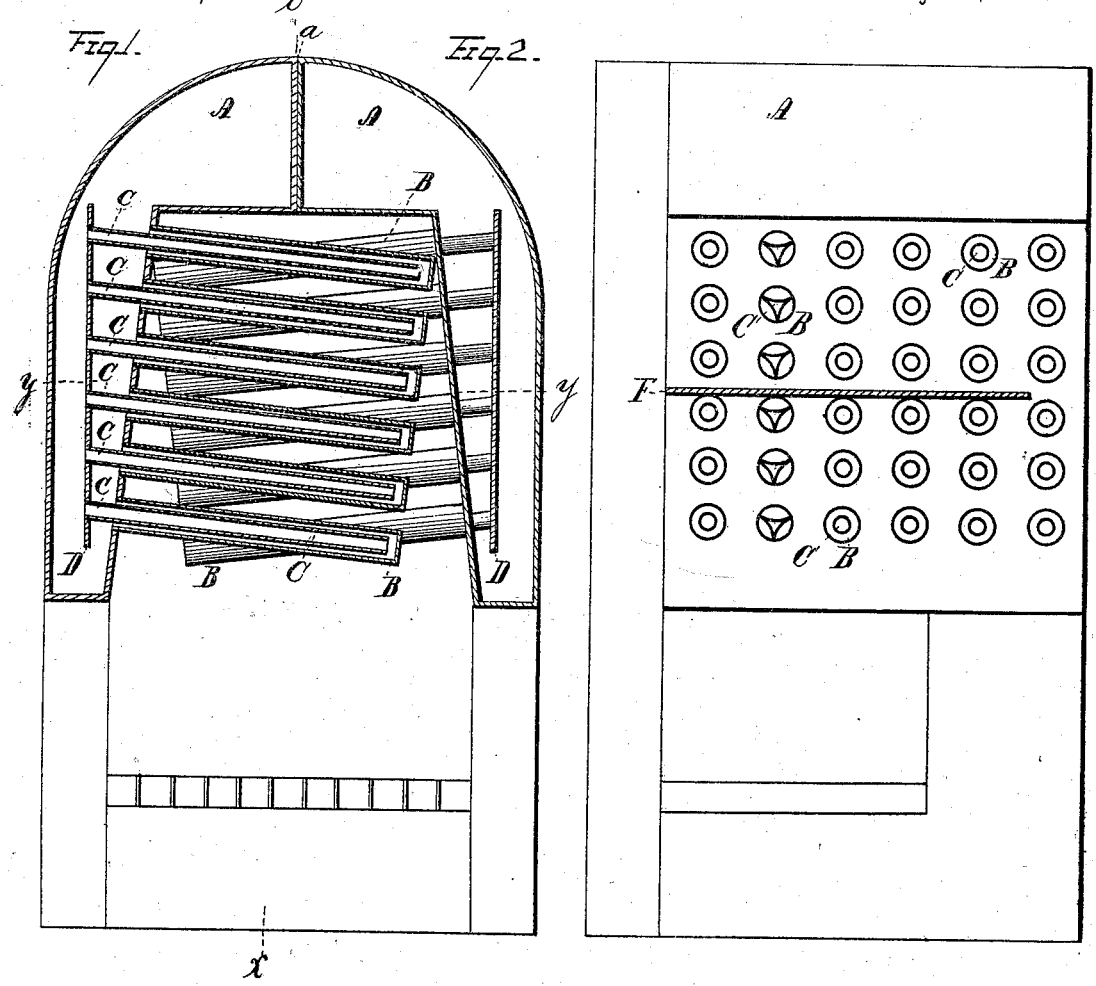

2 Sheets--Sheet 2.

T. ANGELL.
Division Steam-Boilers.

No. 151,190. Patented May 26, 1874.

WITNESSES.
W. T. Newman,
Wm. H. Brereton Jr.

INVENTOR
Thomas Angell
By Leggett & Leggett
Attorneys.

UNITED STATES PATENT OFFICE.

THOMAS ANGELL, OF BROOKLYN, NEW YORK.

IMPROVEMENT IN DIVISION STEAM-BOILERS.

Specification forming part of Letters Patent No. 151,190, dated May 26, 1874; application filed April 21, 1874.

*To all whom it may concern:*

Be it known that I, THOMAS ANGELL, of Brooklyn, in the county of Kings and State of New York, have invented certain new and useful Improvements in Division-Boilers; and I do hereby declare the following to be a full, clear, and exact description of the invention, such as will enable others skilled in the art to which it pertains to make and use it, reference being had to the accompanying drawings, which form part of this specification.

My invention relates to an improved division steam-boiler; and consists in a novel construction, whereby the sections are made of exactly the same pattern, and of other features, as hereinafter set forth and claimed.

Figure 3:
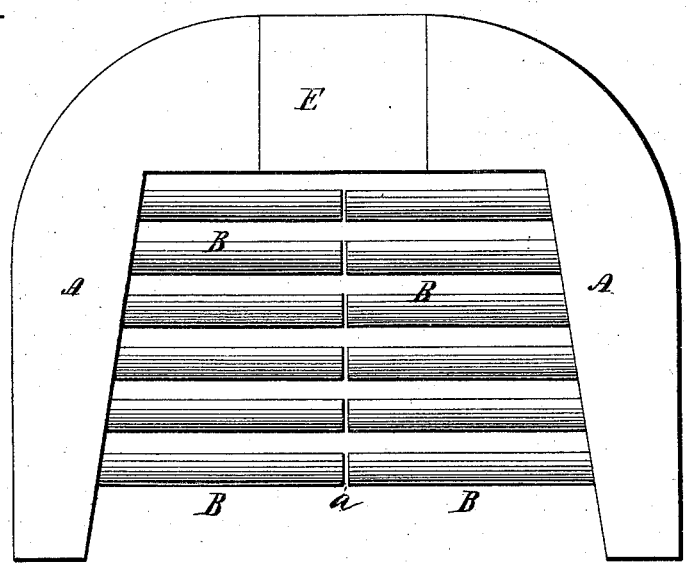
Figure 4:
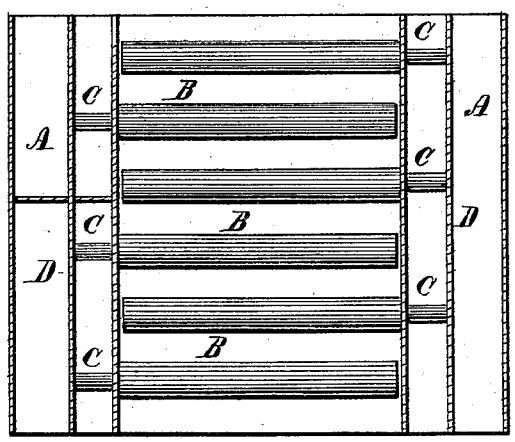

In the drawings, Figure 1 is a vertical section of the boiler parallel to the front, taken through two half-sections, A. Fig. 2 is a section on the line $x\ x$, Fig. 1. Fig. 3 is a variation of my invention, showing a top central section. Fig. 4 is a horizontal section by a plane containing the line $y\ y$, Fig. 1.

A represents one of the half-sections, constructed with suitable exterior form, and having an interior space included in the angle formed by its furnace-walls, that, when the sections are put together, make up the combustion-chamber. B are tubes that are closed at one end, and fastened to the boiler-section A at the other end. These tubes B are made to project from the furnace-plate of the section A into the combustion-chamber. They may be made to extend only to the plane of the surface of juncture $a$ of the boilers; or they may be made to project sufficiently beyond the said plane, as shown in Fig. 1, that when two sections, A A, are placed opposite to each other in position, the tubes B will each reach nearly across the combustion-chamber. These tubes may also pass straight across or into the combustion-chamber, or they may enter it at an angle; and I prefer, generally, to make them enter at a slightly declining angle, so that they will the better hold the water, and yet at not so great an angle as to hold water when not in use sufficient to burst the tubes should the water become frozen.

In order that the said pipes may be uniformly distributed throughout the combustion-chamber, I prefer to attach them to the boiler-section, as shown in Fig. 3, so that when two sections, A, are brought together, the tubes B will match between each other, as there shown. By this means I can produce as much boiler-surface with half the number of tubes B as would be produced with twice the number of tubes were they made to terminate at the middle of the combustion-chamber.

As shown in Fig. 1, tubes C are made to project from a diaphragm, D, into and nearly to the end of the tubes B. The object of these tubes C is to cause a current of cooler water to pass through them into the tubes B, thence into the tubes B, where it is heated, and back into the boiler. The tubes C, instead of terminating in a diaphragm, D, may simply end in the open boiler at a point sufficiently distant from the openings of the tubes B to catch the downward current of cold water. The tubes B terminate in the wall of the section A, and this wall is inclined from the top downward and outward, leaving the combustion-chamber somewhat contracted, as shown, at the top. The object of this incline is, that if the wall were straight or vertical, the heated water and steam from the tubes B would all pass up in a sheet only to the top, without operating upon the mass of water in the boiler; but by the incline given to this wall, the steam is made to pass up in a thick column, and expend its heat upon the whole mass, and cause a considerable downward current of cooler water to take its place.

The tubes C may be round, triangular, or of any other suitable section; or, instead of the tubes C, the tubes B may be simply divided by a diaphragm.

In case the boiler is desired to be broadened, I employ a sectional top piece or crown-section, E, that may be placed between the sections A A at the plane of junction $a$, and the interior of the sections may all of them be properly stayed with ribs or stay-bolts.

One of the advantages gained by this invention is, the facility with which boilers of any size may be made. They are enlarged by simply adding sections. They are repaired by replacing a section, and the sections, no matter where employed between the front and rear of the boiler, are each made from precisely similar patterns.

A metallic plate, F, is placed upon the tubes B in a position suitable to deflect the heat and cause it to traverse the whole chamber before leaving the smoke-flue.

What I claim is—

1. A division-boiler, the interior portion or portions between the ends thereof constructed in similar sections, each of the said sections forming one side and half of the top of the inclosed fire-chamber, substantially as set forth and shown.

2. A division-boiler composed of similar internal half-sections, to each one of which are attached tubes that project into the combustion-chamber, substantially as set forth and shown.

3. The half-sections A A, made alike and provided with tubes B, set into the furnace-plates of same in the manner substantially as set forth, that when placed in position opposite to each other, between the end sections of the boiler, the tubes B will match in between each other, and be uniformly distributed through the combustion-chamber, as described.

4. A section, A, formed with its interior or face wall inclined outward from the top downward, in combination with the tubes B C, substantially as and for the purposes described.

In testimony that I claim the foregoing I have hereunto set my hand this 10th day of April, 1874.

THOMAS ANGELL.

Witnesses:
    WELLS W. LEGGETT,
    GILBERT J. FERRISS.